(122.)
JOHN RADDIN.
Improvement in Car Wheels.
No. 4,702. Reissued Jan. 2, 1872.
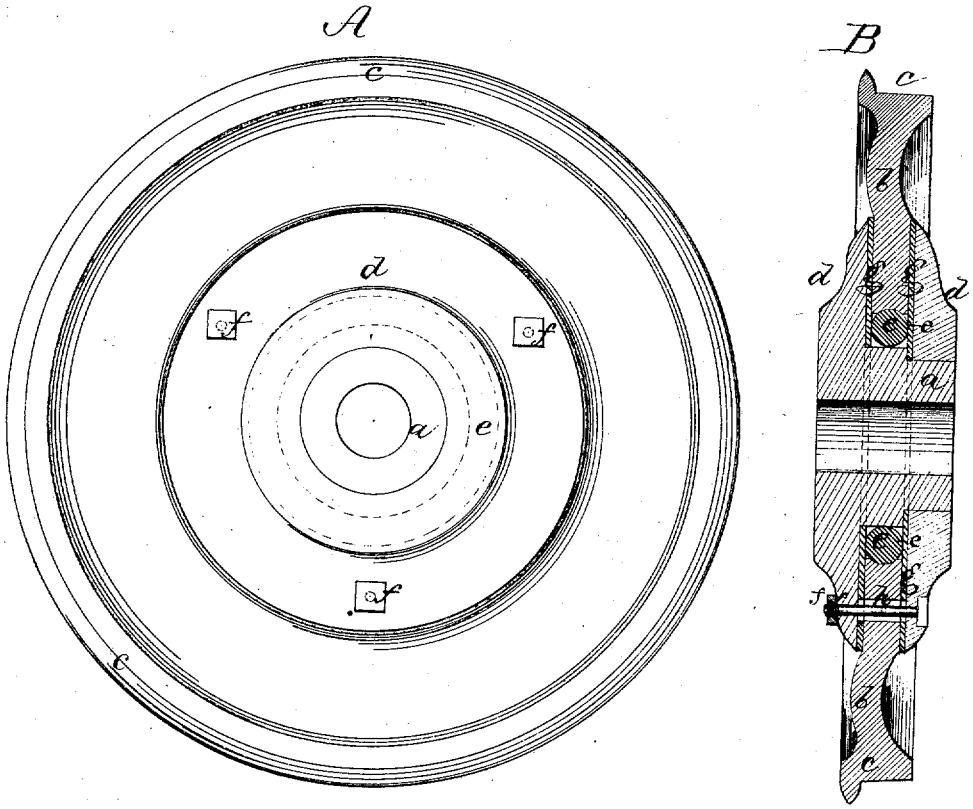
Witnesses
S. H. Latimer
M. W. Frothingham.
John Raddin,
by his Attys
Crosby & Gould

UNITED STATES PATENT OFFICE.

JOHN RADDIN, OF LYNN, MASSACHUSETTS.

IMPROVEMENT IN CAR-WHEELS.

Specification forming part of Letters Patent No. 64,796, dated May 14, 1867; reissue No. 4,702, dated January 2, 1872.

*To all persons to whom these presents may come:*

Be it known that I, JOHN RADDIN, of Lynn, in the county of Essex and State of Massachusetts, have made a new and useful invention of an Improved Elastic Car-Wheel; and I do hereby declare the same to be fully described as follows:

My invention relates to the construction of a car-wheel, with particular reference to combining with the hub and hub-flanges or rim or tread of the wheel, and a web cast integral therewith, an elastic cushion so disposed as to absorb and neutralize the concussions and side thrusts to which car-wheels are subjected upon uneven, curved, or irregular tracks, my construction preventing crystallization and breakage of axles caused by the rigidity of parts in the ordinary construction of car-wheels.

In my invention I make the wheel with a tread-flange or rim, from which projects inwardly a web-plate, integral with the flange, the hub extending centrally through this web, and having at its opposite ends flanges which embrace the opposite sides of the web, there being a circular space between the hub and web and between the opposite flanges, into which space is placed the elastic cushioning material, so that, when the opposite flanges and the web are bolted together by bolts extending through the three, with provision for slight relative movement radially of the hub and web, the weight resting upon the axle will be at all times directly supported upon the elastic material. It is in this construction that my invention primarily consists. The invention also consists in combining with such construction elastic packing-rings, interposed between the hub-flange and the sides of the web.

The drawing represents, in a side elevation at A and in central cross-section at B, a wheel embodying my invention.

*a* denotes the hub; *b*, the web; *c*, the tread or rim, cast integral with the web; *d d*, flanges at opposite ends of the hub; *e*, the elastic ring or cushion between the hub and web; *g g*, the elastic packing-rings between the web and flanges; *f f*, the bolts and nuts that connect the opposite flanges.

It will be observed that these bolts pass through holes *h h* made through the web, and that these holes are made of such larger diameter than the bolts as to permit radial movement of the hub relatively to the web; and that, while these bolts serve to so connect the parts that there cannot be any irregular displacement or any dismemberment, no wear or strain comes directly upon the bolts by reason of such radial movement.

The elastic packing-rings which are placed between the web and the flanges should be of sufficient width to permit holes through them for passage of the bolts from one flange to the other, and of sufficient body and tenacity to resist and neutralize the lateral action to which the wheel is subjected at a high speed upon an uneven, curved, or irregular track.

I claim—

A car-wheel, the entire web and rim of which are cast or formed in one piece, when the inner edge of the web rests on a packing-ring placed directly on the hub, the hub being formed with or supporting flanges or binding-rings, which are bolted to each other through enlarged holes in the web, with or without interposed packing-rings, and when these binding rings or flanges serve chiefly to hold the parts firmly together and permit the main weight to be transmitted directly to the hub, as set forth.

JOHN RADDIN.

Witnesses:

FRANCIS GOULD,
JAMES C. WING.

(122)